US012684631B2

(12) United States Patent
Muthukumar et al.

(10) Patent No.: US 12,684,631 B2

(45) Date of Patent: **\*Jul. 14, 2026**

(54) STATIC SELECTION OF A SESSION MANAGEMENT FUNCTION OR USER PLANE FUNCTION IN A 5G CORE NETWORK

(71) Applicant: T-Mobile USA, Inc., Bellevue, WA (US)

(72) Inventors: Praveen Singaram Muthukumar, Lawrenceville, NJ (US); Aziz Motiwala, Mill Creek, WA (US)

(73) Assignee: T-Mobile USA, Inc., Bellevue, WA (US)

( \* ) Notice: Subject to any disclaimer, the term of this patent is extended or adjusted under 35 U.S.C. 154(b) by 506 days.

This patent is subject to a terminal disclaimer.

(21) Appl. No.: 18/295,531

(22) Filed: Apr. 4, 2023

(65) Prior Publication Data

US 2024/0340979 A1    Oct. 10, 2024

(51) Int. Cl.
*H04W 76/10* (2018.01)
*H04W 48/18* (2009.01)

(52) U.S. Cl.
CPC ........... *H04W 76/10* (2018.02); *H04W 48/18* (2013.01)

(58) Field of Classification Search
CPC ...... H04W 76/10; H04W 48/18; H04W 76/11
USPC ......................................................... 370/329
See application file for complete search history.

(56) References Cited

U.S. PATENT DOCUMENTS

| | | | | |
|---|---|---|---|---|
| 2019/0166467 A1* | 5/2019 | Livanos | ............... | H04W 8/186 |
| 2020/0107213 A1* | 4/2020 | Park | .................... | H04L 12/1407 |
| 2021/0044628 A1* | 2/2021 | Foti | ...................... | H04L 65/1045 |
| 2022/0408353 A1* | 12/2022 | Hegde | ............... | H04W 28/0284 |
| 2023/0077391 A1* | 3/2023 | Guo | .................... | H04L 63/0428 |
| | | | | 726/26 |
| 2024/0357481 A1* | 10/2024 | Hua | ...................... | H04W 76/10 |

* cited by examiner

*Primary Examiner* — Kwang B Yao
*Assistant Examiner* — Syed M Bokhari
(74) *Attorney, Agent, or Firm* — Lee & Hayes, P.C.

(57) ABSTRACT

System and methods for statically selecting a session management function (SMF) or a user plane function (UPF) for a user equipment are described. A mobile device (UE) may transmit a connection request to a 5G core network. A static selection user interface receives inputs of UE and an SMF to associate with the UE. When the UE transmits a connection request, an identifier of the UE is used by a network function repository function (NRF). The NRF accesses an NRF datastore using the identifier. If an SMF is associated with the UE, the NRF returns the SMF instance of the associated SMF to an access management function (AMF) handling the connection request.

17 Claims, 6 Drawing Sheets

STATIC SELECTION USER INTERFACE 168

USER EQUIPMENT SELECTION 302

SMF SELECTION 304

UPF SELECTION 306

RESET STATIC POINTING 308

402 RECEIVE ATTACH REQUEST FROM UE

400

404 TRANSMIT N1/N2 COMMUNICATION

406 TRANSMIT AN SMF ADDRESS REQUEST

408 ACCESS NRF DATASTORE

410 TRANSMIT SMF ADDRESS TO THE AMF

412 ESTABLISH N3 CONNECTION TO UPF

414 ESTABLISH IPV4 LANE TO IMS/ INTERNET

STATIC SELECTION OF A SESSION MANAGEMENT FUNCTION OR USER PLANE FUNCTION IN A 5G CORE NETWORK

BACKGROUND

When a connection attempt to establish a call session is made in a 5G core system, an access management function (AMF) may interact with one or more other components to perform the operations needed to establish this session. These interactions can include authenticating the device attempting to make the connection, authentication a user or a user's account, registering the user equipment (UE) with the network, and the like. In a particular example, the AMF may interact with a session management function (SMF) to establish the session. The SMF may perform various session establishment operations, such as determining and assigning particular functions and/or components to service the session, associating policies for the session, and the like. In examples, a function performed by an SMF may be providing the access information needed by the UE to communicate with a data network using the established session. The SMF selected for use can be provided by a network function (NF) repository function (NRF).

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
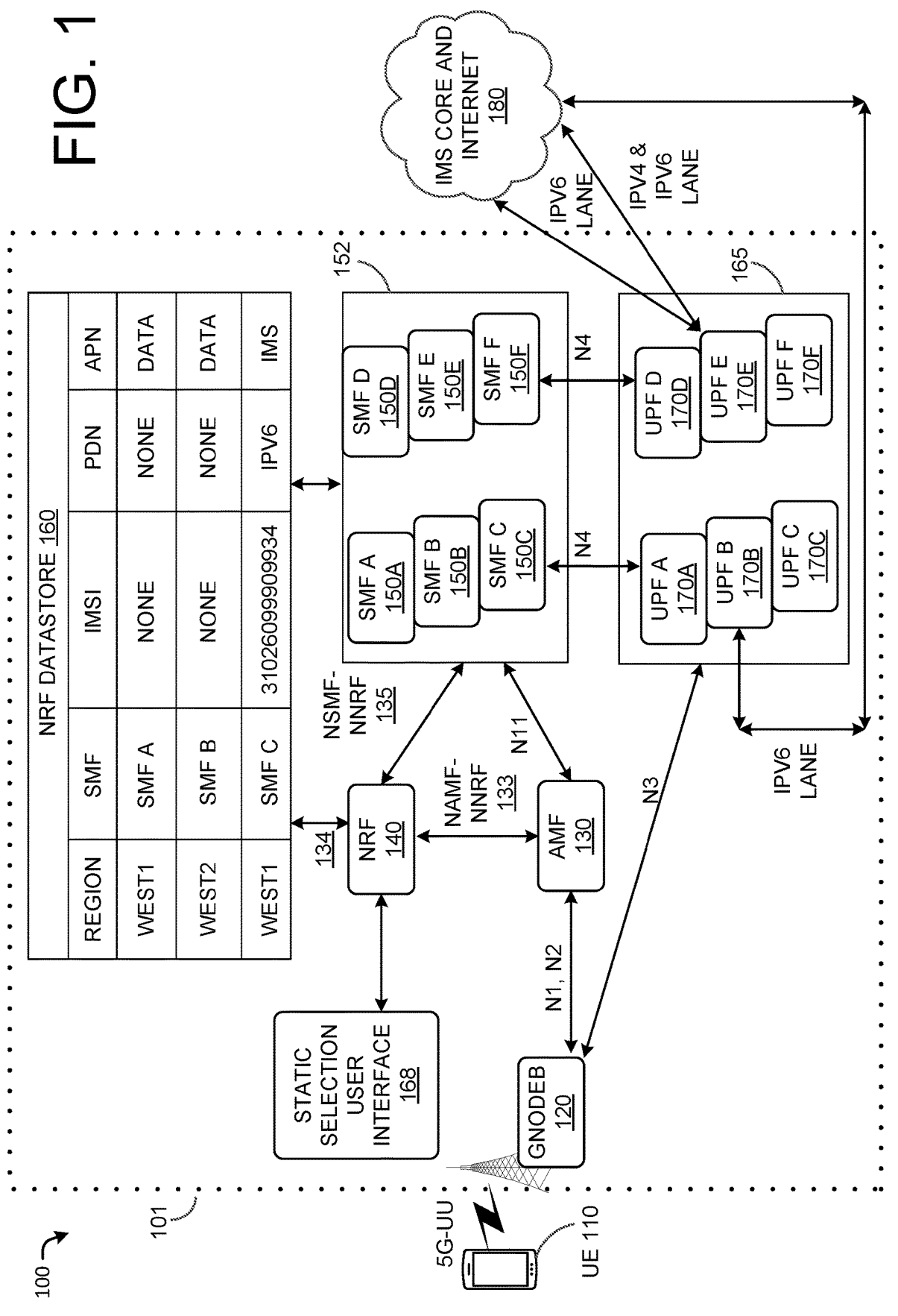
FIG. 1 is a schematic diagram of an illustrative wireless communication network environment in which systems and techniques for s statically electing a user plane function may be implemented, in accordance with examples of the disclosure.

This disclosure is directed in part to systems and techniques for providing a static selection of a session management function or a user plane function in a 5G core system from a static selection user interface (UI). The static selection UI receives an input from a user or other function of the system to direct traffic from a user equipment (UE) (e.g., smartphone, cell phone, mobile device, wireless communication device, mobile station, etc.) to a specific SMF or UPF. Such advanced networks include networks that support New Radio (NR) networks (e.g., 5G NR networks). However, the disclosed systems and techniques may be applicable in any network or system in which a user device may request and receive access to communicate with network and/or remote devices using any protocol.

In conventional systems, a wireless user device (e.g., mobile telephone, smartphone, user equipment (UE), etc.) may wirelessly communicate with a base station (e.g., gNodeB, eNodeB, NodeB, base transceiver station (BTS), etc.) to request wireless communications services, such as a packet data communication session between the user device and a data network (e.g., the Internet, an IP multimedia system or subsystem (IMS), etc.). A UE's attach request may (explicitly or implicitly) indicate one or more network layer communications protocols that the UE may be configured to support. For example, such a request may be a request for an IPv4-only communications connection, an IPv6-only communications connection, or an IPv4v6 communications connection. A request for an IPv4-only communications connection may indicate that the UE can only support IPv4 communications. A request for an IPv6-only communications connection may indicate that the UE can only support IPv6 communications. A request for an IPv4v6 communications connection (also known as a "dual stack" connection) may indicate that the UE supports both IPv4 and IPv6. Such a UE may prefer to use IPv6 but is able to use IPv4 in the event that an IPv6 connection is not available, for example, because the network does not support IPv6. If the network supports IPv4 and IPv6, the UE may determine to which protocol to use for the requested connection. In various embodiments, an attach request may include a packet data network (PDN) type indicator or value or that indicates an IP version supported and/or requested by the UE (e.g., IPv4, IPv6, IPv4v6). Various operations may be performed by network components, devices, and/or functions to obtain or otherwise establish the requested services for the wireless user device. Such operations may include authenticating the wireless user device and/or a user of the device, authorizing the requested services for the device and/or user, registering the device at the various systems and functions needed to provide the requested services, etc.

For example, a UE may transmit a request for a protocol data unit (PDU) session with a data network to a gNodeB. A PDU session, for example in a 5G network, may be an end-to-end communications session between a device (e.g., the UE) and a data network (e.g., the Internet). The gNodeB may relay or otherwise convey this PDU session request to an access management function (AMF) in the core of the wireless network in which the gNodeB is configured. The AMF may interact with one or more other components to perform the operations needed to establish this session, such as authenticating the device and/or user, registering the UE with the network, etc. In a particular example, the AMF may interact with a session management function (SMF) to establish the session. The SMF may perform various session establishment operations, such as determining and assigning particular functions and/or components to service the session, associating policies for the session, etc. In examples, an important function performed by an SMF may be providing the access information needed by the UE to communicate with a data network using the established session. The SMF provides this information to the AMF for relay to the gNodeB and ultimately to the UE requesting the PDU session. In 5G examples, a message that provides such information may be referred to as a "N1N2MessageTransfer." These and other messages communicating similar information may be referred to generally herein as a "message transfer" messages.

Components and functions within a network, such as AMFs and SMFs, may vary and may change often due to operational circumstances (e.g., maintenance, load, failures, etc.). Therefore, in various examples, a network may include a repository component or function that is configured to store and provide current addresses and/or other connectivity information for the functions and/or components in the network. In response to receiving a request from a particular function in a network, a repository function may provide a current address (e.g., IP address) for another function to the requesting function. The requesting function may then use that address to communicate with the associated function to perform one or more operations. In 5G examples, such a repository function may be referred to as a network function (NF) repository function (NRF). These and other functions performing similar operations may be referred to generally herein as a "repository functions." In various embodiments, for example, for load-sharing and/or redundancy purposes, multiple NRFs may be configured in "pools" of NRFs that may be queried by various components and/or functions in (e.g., particular portions of) a core of a wireless network.

In various examples, a particular function may have multiple addresses (e.g., IP addresses) that it may use to communicate with one or more other functions and/or components configured in a network. By using multiple address and/or communications interfaces, a single function or component in a network may interact with multiple other functions and/or components (e.g., substantially simultaneously) and thereby perform various operations more quickly and efficiently. By having multiple address and/or communications interfaces, a single function or component in a network may also have redundant means of communicating with other functions and/or components. For example, if one particular address or interface is no longer reachable for some reason, the function using that address or interface may communicate with other functions and/or components using one of its other addresses or interfaces. In some examples, one or more particular addresses or interfaces configured at a function may be dedicated to one or more particular services or operations, while in other examples, one or more addresses or interfaces configured at a function may be generally available for some or all of the services and/or operations performed at that function. In particular examples, an AMF may be configured with multiple addresses that may be used to communicate with the SMF for various operations, such as PDU session establishment operations.

When requesting various types of PDN sessions in conventional 5G core network, a UE transmits a connection request to the gNodeB (GNB) base station. The request from the GNB comes into the AMF, which queries the NRF. The AMF asks the NRF for all the SMFs based on an access port name (APN)/PDN name. The NRF learns the SMF information when the SMF is published, or made available for use, on the network. The NRF provides the AMF the SMF information. The AMF can select any one of the SMFs that were provided by the NRF. The SMFs are associated with one or more User Plane Functions (UPFs). A UPF performs the function of connecting the data coming over the network to the Internet. The selection of the SMF or UPF used for the session in a conventional 5G network can be unknown when attempting to make the connection for a session. Thus, if a particular SMF or UPF is desired for use, such as for testing a specific SMF or UPF, the SMF or UPF may not be readily tested until enough session connection attempts are made so that the SMF or UPF desired for testing is selected by the AMF.

To address the issue of an unknown (or essentially random) selection of an SMF or UPF, the disclosed systems and methods provide for the use of a modified NRF datastore. The NRF datastore can be modified by a user or other system function so that the NRF, when a particular UE is attempting to make a connection attempt, the NRF returns the value of a particular SMF or UPF. The NRF datastore can be one or more datastores stored in various components of the network. In the presently disclosed subject matter, when the request from the GNB comes into the AMF and queries the NRF, the NRF queries the NRF datastore using an identifier associated with the UE. If the NRF datastore has an SMF or UPF associated with the identifier, the NRF returns the address for the SMF or UPF for the AMF, which thereafter connects the session using the returned address. By facilitating a static selection of an SMF or UPF, the systems and methods described herein can provide a more efficient and accurate selection of SMF and UPF for operations such as testing the particular SMF or UPF, thus reducing resource utilization. Additionally, in some examples, the systems and methods described herein can increase the efficiency for traffic rehome (for a specific IMSI) to a specific SMF/UPF based on business or technical needs.

Illustrative environments, signal flows, and techniques for implementing systems and methods for repository function address blocking are described below. However, the described systems and techniques may be implemented in other environments.

Illustrative System Architecture

FIG. 1 is a schematic diagram of an illustrative wireless network environment 100 in which the disclosed systems and techniques may be implemented. The environment 100 may include a UE 110 that may wirelessly communicate with an gNodeB 120. While referred to as an "eNodeB" for explanatory purpose herein, the gNodeB 120 may be any type of base station, including, but not limited to, any type of base transceiver station (BTS), NodeB, eNodeB, gNodeB, and the like. The gNodeB 120 may communicate with other devices and elements in the core of a wireless communications network 101. The wireless communications network 101 may be any one or more networks that facilitate communications between devices of various types, such as computing device and mobile devices (e.g., UEs). Various connections between devices in the network 101 may be wired, wireless, or a combination thereof. In various embodiments, the wireless communications network 101 may facilitate communications with one or more wireless devices, such as UEs. The wireless communications network 101 may facilitate packet-based communications between such wireless devices and device on the Internet and/or one or more IMSs, such as IMS Core/Internet 180.

In order to facilitate data packet-based communications between the UE 110 and the IMS Core/Internet 180, a user data packet communications session may need to be established. As used herein, such a user data packet communications session may refer to and/or be associated with any user data communications bearer configured to carry user data packets (e.g., user plane traffic) and may be referred to as a data radio bearer. To perform set-up, tear-down, maintenance, and other control operations for a UE and/or an associated user data packet communications session, control communications (e.g., control plane traffic) may be exchanged between network devices and/or UE using sig-
naling radio bearers (that may be referred to simply as
"signaling").

In environment 100, the UE 110 may communicate with
the gNodeB 120 to request the establishment of a PDU
session (e.g., to communicate with one or more systems at
the IMS Core/Internet 180). The gNodeB 120 may relay the
request or otherwise transmit a request for the establishment
of the PDU session to an AMF 130. In various examples, an
AMF 130 may interact with SMFs to allocate the resources
required to establish PDU sessions for UEs. Such interac-
tions may include authenticating and authorizing a user
and/or user device (e.g., UE), creating contexts for such
sessions, determining and applying session policies, estab-
lishing user plane resources, etc. Therefore, the AMF 130,
based on receiving this request for the establishment of a
PDU, i.e., an IPv4-type, session on behalf of the UE 110,
may query a NRF 140 for an address (e.g., IP address) for
an SMF with which it may interact to establish the requested
PDU session. In some examples, the query from the AMF
130 will not include a specific IP type, such as IPv4. In the
example illustrated in FIG. 1, the SMFs available to the NRF
140 for selection are SMF A 150A, SMF B 150B, SMF C
150C, SMF D 150D, SMF E 150E, and SMF F 150F
(hereinafter referred to individually as "the SMF A 150A,"
"the SMF B 150B," and the like, and collectively as "the
SMFs 150) of SMF pool 152.

In the example illustrated in FIG. 1, AMF 130 may
exchange SMF discovery communications 133 (Namf-
Nnrf), which may be called an SMF address request in some
examples, with the NRF 140. In some examples, a wireless
communications network may be configured with one or
more NRF pools, each of which may include one or more
NRFs. In the discovery communication 133, the AMF 130
may provide an identifier of one or more particular SMFs
with which it may wish to interact, or the AMF 130 may
request an SMF address generally. The AMF 130 may or
may not specify in the communication 133 a particular
service for which the AMF 130 is requesting an address. In
the example illustrated in FIG. 1, the AMF 130 identifies that
an IPv4 lane is requested. In some examples, the SMFs may
be geographically located and configured to provide reposi-
tory function services to functions and components that are
relatively geographically proximate to the UE 110 or the
AMF 130. In such examples, there may be one or more pools
of SMFs or NRFs provided for a particular geographical
area or region. The NRFs or SMFs within each pool may be
configured to have synchronized address information for the
various devices represented in each NRF or SMF.

In some examples, after receiving the SMF discovery
communications 133, the NRF 140 transmits an SMF selec-
tion query 134 to an NRF datastore 160. The NRF datastore
160 stores information about the SMFs potentially available
for selection by the AMF 130. The information includes, but
is not limited to, regions for the one or more SMFs 150,
PDNs for the one or more SMFs 150, and/or the APN for
each of the one or more SMFs 150. However, as mentioned
above, unless otherwise restricted, the NRF 140 may return
one or more SMFs 150 that are capable of handling the
communication requested by the UE 110. In order to provide
for a specific SMF, the presently disclosed subject matter
includes a UE identified as part of the SMF discovery
communications 133. In the example illustrated in FIG. 1,
the UE identifier is an international mobile subscriber iden-
tity (IMSI).

When receiving the SMF discovery communications 133,
the NRF 140 determines if an identifier (illustrated by way of example as the IMSI in FIG. 1) is included in the SMF
discovery communications 133. If the NRF 140 determines
that an IMSI is included in the SMF discovery communi-
cations 133, the NRF 140 accesses the NRF datastore 160 to
determine which SMF 150 is associated with the particular
IMSI. In the example illustrated in FIG. 1, the IMSI
31026099909934 is associated with the SMF C 150C. Upon
determining that the IMSI is associated with a particular
SMF 150, such as the SMF C 150C, the NRF 140 returns the
identifier of the SMF C 150C for use by the AMF 130.
Thereafter, the AMF 130 sends a connection request N11 to
the selected SMF C 150C. The selected SMF establishes a
connection to its coordinating UPF or group of UPFs in the
UPF pool 165, which thereafter connects to the IMS Core/
Internet 180 through its particular lane. For example, if the
SMF C 150C is selected, the SMF C 150C instantiates a
connection N3 from the GNodeB 120 to the UPF C 170C to
deliver data from the UE 110 through the IPv6 lane of the
UPF C 170C to the IMS Core/Internet 180.

To associate a particular UE 110 with a particular SMF
150, a static selection user interface (SSUI) 168 is provided.
The SSUI 168 provides an interface for an input of the
identifier, such as the IMSI, that is associated with a par-
ticular SMF 150. Thus, when a UE with the identifier is
attempting to create a session, the session is created using
the associated SMF 150 rather than an indeterminate selec-
tion of one of several SMFs 150. The SSUI 168 allows for
a user (not shown) or other system module (such as an
automated testing module) to modify the NRF datastore 160
IMSI column. For example, as illustrated in FIG. 1, the IMSI
column of the NRF datastore 160 has the IMSI
31026099909934 added to the row for the SMF C 150C.
Thus, when the NRF 140 accesses the NRF datastore 160, if
the NRF 140 determines that the IMSI 31026099909934 is
to be connected using the SMF C 150C, instead of returning
an unknown SMF 150, the NRF 140 returns the SMF C
150C. Thus, when an IMSI (or another identifier) is stored
in the NRF datastore 160, the UE 110 is statically pointed or
directed to the SMF C 150C. To return to a default or normal
operation, the user or other system module clears the IMSI
information, thus de-associating the UE 110 from any par-
ticular SMF 150 (or the UPF in a similar manner). It should
be noted that, in some examples, the present operation may
also be performed from the static selection user interface
168.

Illustrative Signal Flows

Figure 2:
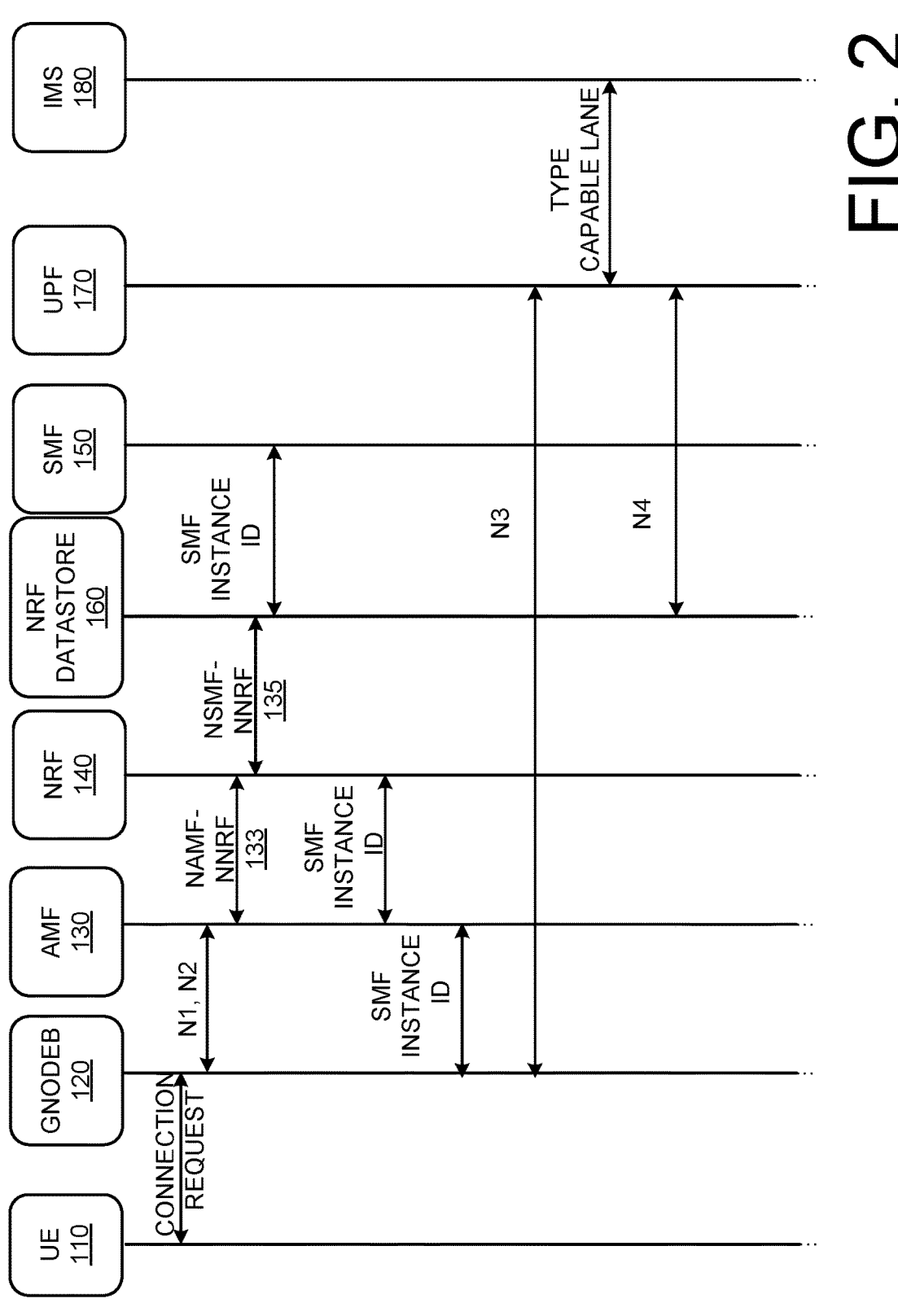
FIG. 2 is a diagram of an illustrative signal flow associated with statically selecting a user plane function, in accordance with examples of the disclosure.

FIG. 2 illustrates an exemplary signal flow 200 of various
messages that may be exchanged in one or more of the
disclosed systems and techniques for more efficiently stati-
cally selecting an SMF for a UE requesting service. Refer-
ence may be made in this description of the signal flow 200
to devices, entities, and interfaces illustrated in FIG. 1 and
described in regard to that figure. However, the operations,
signals, and signal flow illustrated in FIG. 2 and described
herein may be implemented in any suitable system and/or
with any one or more suitable devices and/or entities.
Moreover, any of the operations, signals, and/or entities
described in regard to FIG. 2 may be used separately and/or
in conjunction with other operations, signals, and/or entities.
All such embodiments are contemplated as within the scope
of the instant disclosure.

The UE 110 transmits a connection request to the
GNodeB 120. The transmit request can include, among other
information, a request for an IPv4 lane, an IPv6 lane, other
types of traffic handled by one or more UPFs 170. The
GNodeB 120 transmits an N1/N2 communication to the
AMF 130. In various examples, the AMF 130 may transmit an SMF discovery communications 133 to the NRF 140 requesting an address for an SMF. The SMF discovery communications 133 may include any one or more of an instance identifier of a specific SMF, a specific service, a specific function, a notification of lane type request, and the like. Alternatively, the SMF discovery communications 133 may be more general, requesting an SMF generally or a function to provide particular service (session setup or management), and the like. The SMF discovery communications 133 includes an identifier for the UE 110. In some examples the identifier is the IMSI for the UE 110, although other types of identifiers (including the username of the user using the UE 110) may be used and are considered to be within the scope of the presently disclosed subject matter.

In response to the SMF discovery communications 133, the NRF 140 accesses the NRF datastore 160 through an SMF connection communication 135 (NSMF-NNRF). The NRF 140 determines if the IMSI provided in the SMF discovery communications 133 is listed in the NRF datastore 160. If the IMSI is listed in the NRF datastore 160 as being associated with a particular SMF, the NRF 140 retrieves from the NRF datastore 160 the associated SMF (or UPF if so configured) instance ID. If the IMSI is not listed in the NRF datastore 160 as being associated with a particular SMF, the NRF 140 retrieves from the NRF datastore 160 the instance ID of one of the available SMFs (or UPF if so configured). The instance ID of the determined SMF 150 (either the statically directed SMF or one of the available SMFs if not statically directed) is transmitted to the AMF 130, which then transmits the instance ID to the GNodeB 120. Using the instance ID of the determined SMF 150, the GNodeB 120 establishes the N3 interface between the GNodeB 120 and the user plane functions. Further, the N4 interface is established between the determined SMF 150 and a corresponding UPF 170 that is capable of handling requested type of traffic from the UE 110.

Example User Interface

Figure 3:
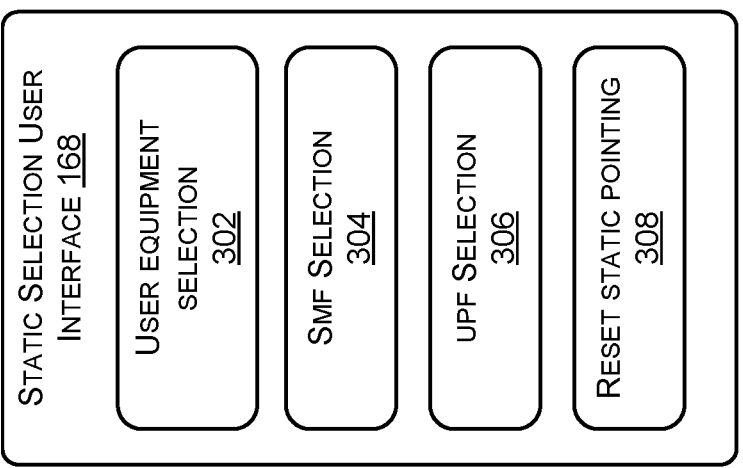
FIG. 3 is an illustration of an example static selection user interface for statically selecting an SMF or UPF for use by the UE, in accordance with examples of the disclosure.

FIG. 3 is an illustration of an example static selection user interface 168 for statically selecting an SMF or UPF for use by the UE 110. As described herein, the SSUI 168 may be implemented as a graphical user interface for use by a user (such as an employee). The SSUI 168 may also be implemented as an application programming interface (API) wherein a system may communication with the wireless network environment 100 of FIG. 1. The SSUI 168 includes as inputs a user equipment selection 302, an SMF selection 304, a UPF selection 306, and a reset static pointing 308. The inputs received by the SSUI 168 are inputs to the NRF datastore 160.

When a user or other entity or module desires for a specific SMF or a UPF to be used during a session, the SSUI 168 receives as an input a user equipment selection 302. The user equipment selection 302 may include an identifier, such as an IMSI of the UE 110. The user is then prompted to input an SMF or UPF into the SMF selection 304 or the UPF selection 306, respectively. Once received, the NRF datastore 160 is updated with the inputs received at the SSUI 168. The NRF 140 thereafter uses the information in the NRF datastore 160 to determine which SMF or UPF identifier to transmit to the AMF 130. The SSUI 168 further includes the reset static pointing 308 input. The reset static pointing 308 input removes the association of an SMF with a particular UE to return the operation involving the UE 110 to a default operation, wherein the default operation removes an associated SMF from the UE 110.

It should be noted that the SSUI 168 may also be used to connect sessions using a particular SMF or UPF regardless of the user equipment attempting to make the call. For example, a user or other entity may enter a "wildcard" value into the IMSI for all of the SMFs 150, whereby any IMSI searched by the NRF 140 (or other identifier) would return a positive search result. For example, instead of the specific IMSI 31026099909934, the user equipment selection 302 inputted may be for SMF A 150A an IMSI such as **********, whereby the symbols signal a wildcard search input so that any IMSI received would be directed to the SMF A 150A. In this example, SMF A 150A is statically directed to regardless of the user equipment attempting to make the connection.

Illustrative Operations

Figure 4:
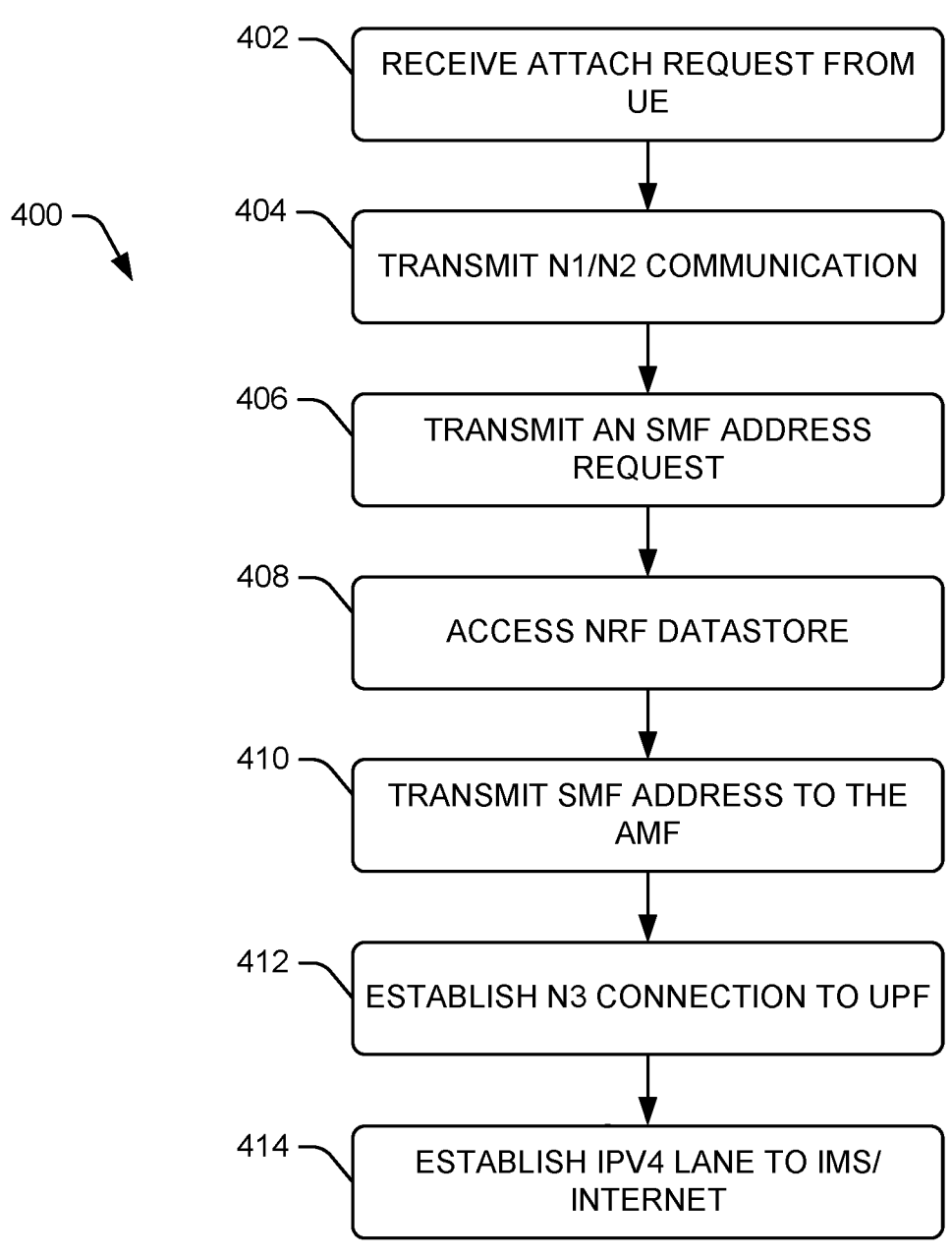
FIG. 4 is a flow diagram of an illustrative process for statically selecting capable user plane functions, in accordance with examples of the disclosure.

FIG. 4 shows a flow diagram of an illustrative process 400 for statically selecting an SMF or UPF according to the disclosed embodiments. The process 400 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 400 may be described with reference to the wireless network environment 100 of FIG. 1, however other environments may also be used.

At block 402, the gNodeB 120 receives a connection (attach) request from the UE. The transmit request can include, among other information, an identifier of the UE 110. As noted above, the identifier of the UE 110 may be the IMSI of the UE 110, a username of the user using the UE 110, and the like.

At block 404, the GNodeB 120 transmits an N1/N2 communication to the AMF 130. The N1/N2 communication includes the identifier of the UE 110.

At block 406, the AMF 130 may transmit an SMF discovery communications 133 to the NRF 140 requesting an address for an SMF. The SMF discovery communications 133 may include any one or more of an identifier of a specific SMF, a specific service, a specific function, a notification of an IPv4-type request, etc. Alternatively, the SMF discovery communications 133 may be more general, requesting an SMF generally or a function to provide particular service (session setup or management), and the like.

At block 408, the NRF 140 accesses the NRF datastore 160 and searches the IMSI column of the NRF datastore 160. The NRF 140 searches to determine if the UE 110 has been statically pointed to a particular SMF. If the UE 110 has been statically pointed to a particular SMF, the NRF 140 retrieves the instance ID (address) of the associated SMF. If the UE 110 has not been statically pointed to a particular SMF, the NRF 140 retrieves the instance ID (address) of one of the available SMFs.

At block 410, the NRF 140 transmits the address of the selected SMF to the AMF 130.

At block 412, using the instance ID of the SMF 150, the GNodeB 120 establishes the N3 interface between the GNodeB 120 and the user plane functions.

At block 414, the N4 interface is established between the SMF 150 and the corresponding UPF 170 handling the data requests from the UE 110.

Example User Equipment

Figure 5:
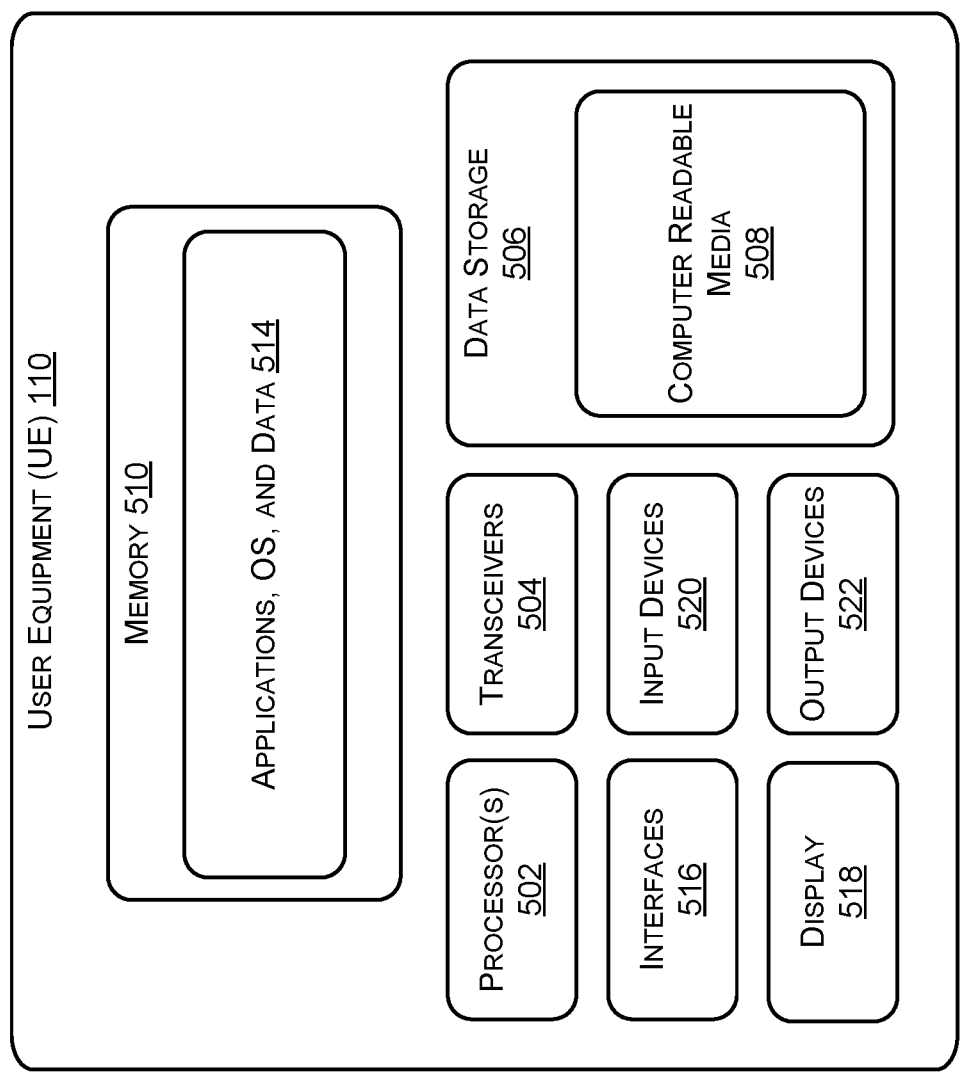
FIG. 5 is a schematic diagram of illustrative components in an example user device that is configured for selecting capable user plane functions, in accordance with examples of the disclosure.

FIG. 5 is an example of a UE, such as UE 110, for use with the systems and methods disclosed herein, in accordance with some examples of the present disclosure. The UE 110 may include one or more processors 502, one or more transmit/receive antennas (e.g., transceivers or transceiver antennas) 504, and a data storage 506. The data storage 506 may include a computer readable media 508 in the form of memory and/or cache. This computer-readable media may include a non-transitory computer-readable media. The processor(s) 502 may be configured to execute instructions, which can be stored in the computer readable media 508 and/or in other computer readable media accessible to the processor(s) 502. In some configurations, the processor(s) 502 is a Central Processing Unit (CPU), a Graphics Processing Unit (GPU), or both CPU and GPU, or any other sort of processing unit. The transceiver antenna(s) 504 can exchange signals with a base station, such as gNodeB 120.

The UE 110 may be configured with a memory 510. The memory 510 may be implemented within, or separate from, the data storage 506 and/or the computer readable media 508. The memory 510 may include any available physical media accessible by a computing device to implement the instructions stored thereon. For example, the memory 510 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information, and which may be accessed by the UE 110.

The memory 510 can store several modules, such as instructions, data stores, and so forth that are configured to execute on the processor(s) 502. In configurations, the memory 510 may also store one or more applications 514 configured to receive and/or provide voice, data and messages (e.g., SMS messages, Multi-Media Message Service (MMS) messages, Instant Messaging (IM) messages, Enhanced Message Service (EMS) messages, etc.) to and/or from another device or component (e.g., the gNodeB 120). The applications 514 may also include one or more operating systems and/or one or more third-party applications that provide additional functionality to the UE 110.

Although not all illustrated in FIG. 5, the UE 110 may also comprise various other components, e.g., a battery, a charging unit, one or more network interfaces 516, an audio interface, a display 518, a keypad or keyboard, and one or more input devices 520, and one or more output devices 522.

Example Computing Device

FIG. 5 is an example of a computing device 600 for use with the systems and methods disclosed herein, in accordance with some examples of the present disclosure. The computing device 600 can be used to implement various components of a core network, a base station, and/or any servers, routers, gateways, gateway elements, administrative components, etc. that can be used by a communication provider. One or more computing devices 600 can be used to implement the network 101, for example. One or more computing devices 600 can also be used to implement base stations and other components. One or more computing devices 600 can also be used to implement user access devices, such as the SSUI 168 of FIG. 1.

In various embodiments, the computing device 600 can include one or more processing units 602 and system memory 604. Depending on the exact configuration and type of computing device, the system memory 604 can be volatile (such as RAM), non-volatile (such as ROM, flash memory, etc.) or some combination of the two. The system memory 604 can include an operating system 606, one or more program modules 608, and can include program data 610. The system memory 604 may be secure storage or at least a portion of the system memory 604 can include secure storage. The secure storage can prevent unauthorized access to data stored in the secure storage. For example, data stored in the secure storage can be encrypted or accessed via a security key and/or password. The program modules can include instructions to execute the SSUI 168 of FIG. 1.

Figure 6:
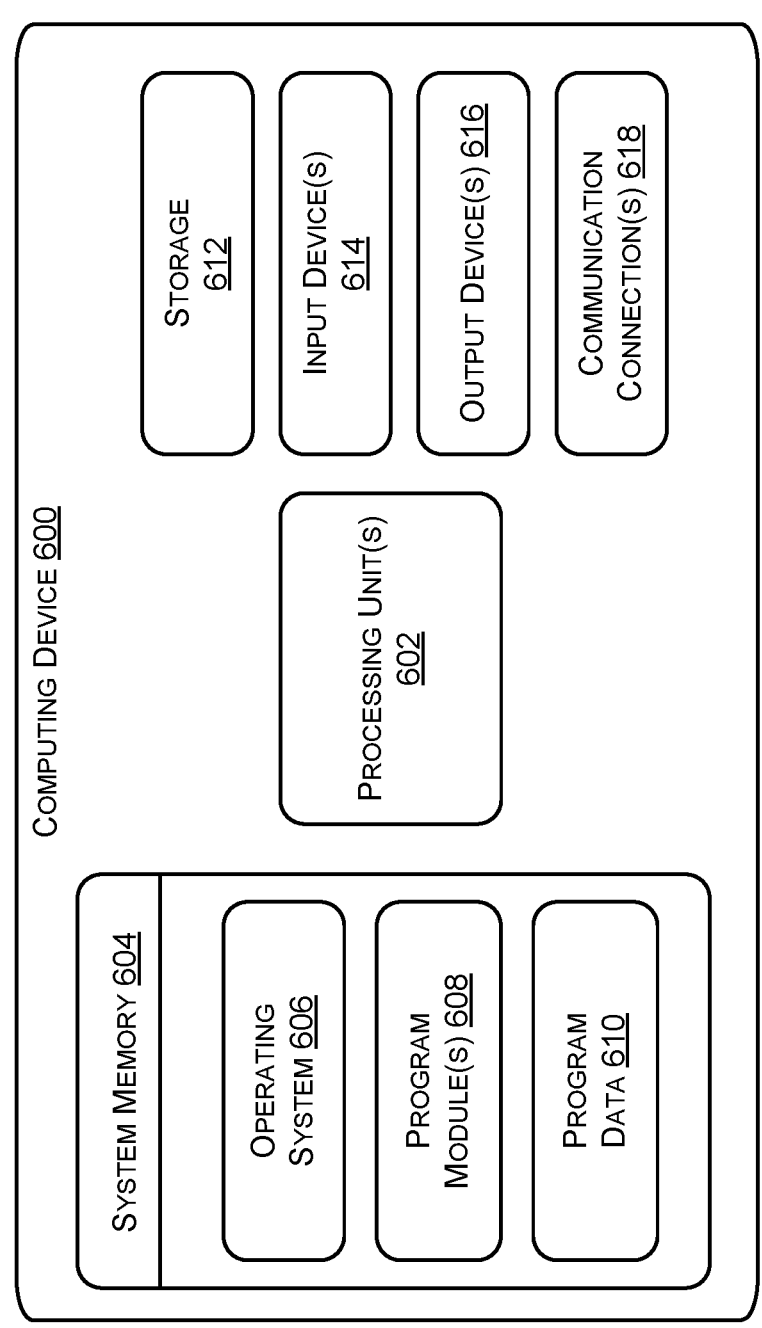
FIG. 6 is a schematic diagram of illustrative components in an example computing device that is configured for statically selecting capable user plane functions, in accordance with examples of the disclosure.

The computing device 600 can also include additional data storage devices (removable and/or non-removable) such as, for example, magnetic disks, optical disks, or tape. Such additional storage is illustrated in FIG. 6 by storage 612.

Non-transitory computer storage media of the computing device 600 can include volatile and nonvolatile, removable and non-removable media implemented in any method or technology for storage of information, such as computer readable instructions, data structures, program modules, or other data. The system memory 604 and storage 612 are examples of computer readable storage media. Non-transitory computer readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by computing device 600. Any such non-transitory computer readable storage media can be part of the computing device 600.

In various embodiment, any or all of the system memory 604 and storage 612 can store programming instructions which, when executed, implement some or all of the functionality described above as being implemented by one or more systems configured in the environment 100 and/or components of the network 101.

The computing device 600 can also have one or more input devices 614 such as a keyboard, a mouse, a touch-sensitive display, voice input device, etc. The computing device 600 can also have one or more output devices 616 such as a display, speakers, a printer, etc. can also be included. The computing device 600 can also contain one or more communication connections 618 that allow the device to communicate with other computing devices using wired and/or wireless communications.

Example Clauses

The following paragraphs describe various examples. Any of the examples in this section may be used with any other of the examples in this section and/or any of the other examples or embodiments described herein.

A. All methods, systems, and apparatuses, including all equivalents, disclosed herein.

B. A method, comprising: receiving, at an access management function (AMF) of a 5G core network from a user equipment (UE), a connection request comprising an identifier of the UE; transmitting, from the AMF to a network function repository function (NRF), a request for a session management function (SMF) instance ID of one of a plurality of SMFs and the identifier of the UE; accessing, by the NRF, an NRF datastore using the identifier of the UE; determining, by the NRF, if the identifier of the UE is statically directed to an associated SMF of the plurality of SMFs; if the identifier of the UE is statically directed to an associated SMF of the plurality of SMFs, returning the SMF instance ID of the associated SMF to the AMF; and if the identifier of the UE is not statically directed to an associated SMF of the plurality of SMFs, returning at last one SMF instance ID of the plurality of SMFs to the AMF.

C. The method of paragraph B, further comprising transmitting to the AMF an identification of the SMF.

D. The method of any of paragraphs A-C, further comprising: receiving, from a static selection user interface, the identifier of the UE; receiving, from the static selection user interface, the associated SMF to associate with the identifier of the UE; and updating the NRF datastore with the identifier of the UE and the associated SMF.

E. The method of any of paragraphs A-D, further comprising: receiving, from the static selection user interface, a reset static pointing input; and removing the identifier of the UE and the associated SMF to return the UE to a default operation.

F. The method of any of paragraphs A-E, wherein the identifier of the UE comprises an international mobile subscriber identity (IMSI).

G. The method of any of paragraphs A-F, wherein the identifier of the UE comprises a username of a user.

H. The method of any of paragraphs A-G, further comprising instantiating an N3 connection from a base station in communication with the UE to a UPF associated with the associated SMF.

I. The method of any of paragraphs A-H, further comprising establishing an N4 interface between the associated SMF and a UPF associated with the associated SMF.

J. The method of any of paragraphs A-I, wherein the UPF is capable of handling IPv4 traffic or IPv6 traffic.

K. A static selection user interface (SSUI) of a wireless network for statically selecting a session management function (SMF) of a plurality of SMFs, the SSUI configured to; receive a user equipment (UE) selection input comprising an identifier of the UE; receive an SMF selection input to associate an SMF of the plurality of SMFs as an associated SMF of the UE having the identifier of the UE; and update a network function (NF) repository function (NRF) datastore so that, when the wireless network receives a connection request at an access management function (AMF) comprising the identifier of the UE from the UE, the wireless network: transmits, from the AMF to the NRF, a request for a session management function (SMF) instance ID of one of the plurality of SMFs and the identifier of the UE; accesses, by the NRF, an NRF datastore using the identifier of the UE; determines, by the NRF, if the identifier of the UE is statically directed to the associated SMF of the plurality of SMFs; if the identifier of the UE is statically directed to the associated SMF of the plurality of SMFs, returns the SMF instance ID of the associated SMF to the AMF; and if the identifier of the UE is not statically directed to the associated SMF of the plurality of SMFs, returns at last one SMF instance ID of the plurality of SMFs to the AMF.

L. The SSUI of paragraph K, wherein the wireless network further transmits to the AMF an identification of the selected SMF.

M. The SSUI of any of paragraphs K-L, wherein the identifier of the UE comprises an international mobile subscriber identity (IMSI).

N. The SSUI of any of paragraphs K-M, wherein the identifier of the UE comprises a username of a user.

O. The SSUI of any of paragraphs K-N, wherein the wireless network further instantiates an N3 connection from a base station in communication with the UE to a UPF associated with the associated SMF.

P. The SSUI of any of paragraphs K-O, wherein the wireless network further establishes an N4 interface between the associated SMF and a UPF associated with the associated SMF.

Q. A non-transitory computer-readable media storing computer-executable instructions that, when executed by one or more processors, cause the one or more processors to perform operations comprising: receiving, at an access management function (AMF) of a 5G core network from a user equipment (UE), a connection request comprising an identifier of the UE; transmitting, from the AMF to a network function repository function (NRF), a request for a session management function (SMF) instance ID of one of a plurality of SMFs and the identifier of the UE; accessing, by the NRF, an NRF datastore using the identifier of the UE; determining, by the NRF, if the identifier of the UE is statically directed to an associated SMF of the plurality of SMFs; if the identifier of the UE is statically directed to an associated SMF of the plurality of SMFs, returning the SMF instance ID of the associated SMF to the AMF; and if the identifier of the UE is not statically directed to an associated SMF of the plurality of SMFs, returning at last one SMF instance ID of the plurality of SMFs to the AMF.

R. The non-transitory computer-readable media of paragraph Q, further comprising computer-executable instructions that, when executed by the one or more processors, cause the one or more processors to perform operations comprising transmitting to the AMF an identification of the SMF.

S. The non-transitory computer-readable media of any of paragraphs Q-R, further comprising computer-executable instructions that, when executed by the one or more processors, cause the one or more processors to perform operations comprising: receiving, from a static selection user interface, the identifier of the UE; receiving, from the static selection user interface, the associated SMF to associate with the identifier of the UE; and updating the NRF datastore with the identifier of the UE and the associated SMF.

T. The non-transitory computer-readable media of any of paragraphs Q-S, further comprising computer-executable instructions that, when executed by the one or more processors, cause the one or more processors to perform operations comprising: receiving, from the static selection user interface, a reset static pointing input; and removing the identifier of the UE and the associated SMF to return the UE to a default operation.

U. The non-transitory computer-readable media of any of paragraphs Q-T, wherein the identifier of the UE comprises an international mobile subscriber identity (IMSI).

While the example clauses described above are described with respect to one particular implementation, it should be understood that, in the context of this document, the content of the example clauses can also be implemented via a method, device, system, computer-readable medium, and/or another implementation. Additionally, any of the examples A-U can be implemented alone or in combination with any other one or more of the examples A-U.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method, comprising:

receiving, at an access management function (AMF) of a 5G core network from a user equipment (UE), a connection request comprising an identifier of the UE;

transmitting, from the AMF to a network function repository function (NRF), a request for a session management function (SMF) instance ID of one of a plurality of SMFs and the identifier of the UE;

accessing, by the NRF, an NRF datastore using the identifier of the UE;

determining, by the NRF, if the identifier of the UE is statically directed to an associated SMF of the plurality of SMFs by an association stored in the NRF datastore, the association being between the identifier of the UE and information for the associated SMF;

if the identifier of the UE is statically directed to an associated SMF of the plurality of SMFs, returning the SMF instance ID of the associated SMF to the AMF;

if the identifier of the UE is not statically directed to an associated SMF of the plurality of SMFs, returning at least one SMF instance ID of the plurality of SMFs to the AMF;

receiving, from a static selection user interface, the identifier of the UE;

receiving, from the static selection user interface, the information for the associated SME to associate with the identifier of the UE; and updating the NRF datastore with the association of the identifier of the UE and the information for the associated SMF.

2. The method of claim 1, further comprising transmitting to the AMF an identification of the SMF.

3. The method of claim 1, further comprising:

receiving, from the static selection user interface, a reset static pointing input; and removing the association of the identifier of the UE and the information for the associated SMF to return the UE to a default operation.

4. The method of claim 1, wherein the identifier of the UE comprises an international mobile subscriber identity (IMSI).

5. The method of claim 1, wherein the identifier of the UE comprises a username of a user.

6. The method of claim 1, further comprising instantiating an N3 connection from a base station in communication with the UE to a UPF associated with the associated SMF.

7. The method of claim 1, further comprising establishing an N4 interface between the associated SMF and a UPF associated with the associated SMF.

8. The method of claim 7, wherein the UPF is capable of handling IPv4 traffic or IPv6 traffic.

9. A non-transitory computer-readable media storing computer-executable instructions that, when executed by one or more processors, cause the one or more processors to perform operations comprising:

receiving, at an access management function (AMF) of a 5G core network from a user equipment (UE), a connection request comprising an identifier of the UE;

transmitting, from the AMF to a network function repository function (NRF), a request for a session management function (SMF) instance ID of one of a plurality of SMFs and the identifier of the UE;

accessing, by the NRF, an NRF datastore using the identifier of the UE;

determining, by the NRF, if the identifier of the UE is statically directed to an associated SMF of the plurality of SMFs by an association stored in the NRF datastore, the association being between the identifier of the UE and information for the associated SMF;

if the identifier of the UE is statically directed to an associated SMF of the plurality of SMFs, returning the SMF instance ID of the associated SMF to the AMF;

if the identifier of the UE is not statically directed to an associated SMF of the plurality of SMFs, returning at least one SMF instance ID of the plurality of SMFs to the AMF;

receiving, from a static selection user interface, the identifier of the UE;

receiving, from the static selection user interface, the information for the associated SMF to associate with the identifier of the UE; and updating the NRF datastore with the association of the identifier of the UE and the information for the associated SMF.

10. The non-transitory computer-readable media of claim 9, further comprising computer-executable instructions that, when executed by the one or more processors, cause the one or more processors to perform operations comprising transmitting to the AMF an identification of the SMF.

11. The non-transitory computer-readable media of claim 9, further comprising computer-executable instructions that, when executed by the one or more processors, cause the one or more processors to perform operations comprising:

receiving, from the static selection user interface, a reset static pointing input; and removing the association of the identifier of the UE and the information for the associated SMF to return the UE to a default operation.

12. The non-transitory computer-readable media of claim 9, wherein the identifier of the UE comprises an international mobile subscriber identity (IMSI).

13. A system comprising:

one or more processors; and computer-executable instructions that, when executed by one or more processors, cause the one or more processors to perform operations including:

receiving, at an access management function (AMF) of a 5G core network from a user equipment (UE), a connection request comprising an identifier of the UE;

transmitting, from the AMF to a network function repository function (NRF), a request for a session management function (SMF) instance ID of one of a plurality of SMFs and the identifier of the UE;

accessing, by the NRF, an NRF datastore using the identifier of the UE;

determining, by the NRF, if the identifier of the UE is statically directed to an associated SMF of the plurality of SMFs by an association stored in the NRF datastore, the association being between the identifier of the UE and information for the associated SMF;

if the identifier of the UE is statically directed to an associated SMF of the plurality of SMFs, returning the SMF instance ID of the associated SMF to the AMF;

if the identifier of the UE is not statically directed to an associated SMF of the plurality of SMFs, returning at least one SMF instance ID of the plurality of SMFs to the AMF;

receiving, from a static selection user interface, the identifier of the UE;

receiving, from the static selection user interface, the information for the associated SMF to associate with the identifier of the UE; and updating the NRF datastore with the association of the identifier of the UE and the information for the associated SMF.

14. The system of claim 13, further comprising computer-executable instructions that, when executed by the one or more processors, cause the one or more processors to perform operations including transmitting to the AMF an identification of the SMF.

15. The system of claim 13, further comprising computer-executable instructions that, when executed by the one or more processors, cause the one or more processors to perform operations including:

receiving, from the static selection user interface, a reset static pointing input; and removing the association of the identifier of the UE and the information for the associated SMF to return the UE to a default operation.

16. The system of claim 13, wherein the identifier of the UE comprises an international mobile subscriber identity (IMSI).

17. The system of claim 13, computer-executable instructions that, when executed by the one or more processors, cause the one or more processors to perform operations including establishing an N4 interface between the associated SMF and a user plane function (UPF) associated with the associated SMF, wherein the UPF is capable of handling IPV4 traffic or IPv6 traffic.

* * * * *